United States Patent [19]
Fletcher et al.

[11] 3,795,858
[45] Mar. 5, 1974

[54] INVERTER RATIO FAILURE DETECTOR

[76] Inventors: James C. Fletcher, Administrator of the National Aeronautics and Space Administration with respect to an invention by; Albert P. Wagner, Pasadena, Calif.; Theodore J. Ebersole, King of Prussia; Robert E. Andrews, Folsom, both of Pa.

[22] Filed: May 10, 1973

[21] Appl. No.: 359,157

[52] U.S. Cl. .............................. 324/57 R, 321/8 R
[51] Int. Cl. ............................................. G01r 27/00
[58] Field of Search.............. 324/57 R; 321/8 R, 44

[56] References Cited
UNITED STATES PATENTS
| | | | |
|---|---|---|---|
| 3,039,057 | 6/1962 | Connors........................ | 324/57 R X |
| 3,281,673 | 10/1966 | Richardson.................. | 324/57 R X |
| 3,387,211 | 6/1968 | Kaufmann et al............. | 324/57 R X |
| 3,555,415 | 1/1971 | Shoemaker et al.............. | 324/57 R |

Primary Examiner—Stanley T. Krawczewicz
Attorney, Agent, or Firm—Monte F. Mott; John R. Manning; Paul F. McCaul

[57] ABSTRACT

A failure detector which detects the failure of a DC to AC inverter is disclosed. The inverter under failureless conditions is characterized by a known linear relationship of its input and output voltages and by a known linear relationship of its input and output currents. The detector includes circuitry which is responsive to the detector's input and output voltages and which provides a failure-indicating signal only when the monitored output voltage is less by a selected factor, than the expected output voltage for the monitored input voltage, based on the known voltages' relationship. Similarly, the detector includes circuitry which is responsive to the input and output currents and provides a failure-indicating signal only when the input current exceeds by a selected factor the expected input current for the monitored output current based on the known currents' relationship.

10 Claims, 4 Drawing Figures

INVERTER RATIO FAILURE DETECTOR

ORIGIN OF INVENTION

The invention described herein was made in the performance of work under a NASA contract and is subject to the provisions of Section 305 of the National Aeronautics and Space Act of 1958; Public Law 85–568 (72 Stat. 435; USC 2457).

BACKGROUND OF THE INVENTION

1. Field of the Invention:

The present invention relates to failure detection circuitry and, more particularly, to a failure detector for indicating the failure of a specific circuit based on its input and output voltages and/or its input and output currents.

2. Description of the Prior Art:

In many applications, inverters are used to convert electrical energy of one type, e.g., direct current (DC) to another type, such as alternating current (AC). Extensive use of such DC to AC inverters is made in space exploration applications. For long exploratory missions, several identical inverters are included in the spacecraft so that when one inverter fails for some reason, another stand-by inverter can be switched in to replace the faulty inverter. However, for switching to take place, it is necessary to determine first that the inverter which is in use is indeed faulty and should be replaced.

If the inverter is designed to operate with an output overload including a short circuit, such an overload may result in significant reduction in the inverter's input and output voltages as well as in excessive input and output currents under normal inverter operating conditions. Also, under normal operating conditions, from no load to full load, the input and output currents will vary over a substantial range but the voltages will remain substantially constant. Consequently, fixed limits, such as excessive input current or low output voltage cannot be used directly to determine inverter failure, since such limits may be exceeded due to source or load failures rather than due to inverter failure. A need therefore exists for a circuit which is capable of indicating inverter failure based on the known operating characteristics of the inverter.

OBJECTS AND SUMMARY OF THE INVENTION

It is a primary object of the present invention to provide a circuit for detecting inverter failure based on the known operating characteristics of the inverter under normal inverter failureless conditions.

Another object of the present invention is to provide a circuit for detecting the failure of a DC to AC inverter of known operating characteristics.

A further object of the present invention is to provide a circuit for detecting the failure of an inverter based on known relationships of the input and output voltages and currents.

These and other objects of the invention are achieved by providing a circuit in which failure of the inverter is detected by continuously monitoring the relationships of the inverter's input and output voltages and input and output currents. Whenever the relationship between the input voltage and output voltage, which is known under inverter failureless conditions, deviates by more than a selected factor, a signal, indicating inverter failure, is produced. Similarly, such a signal is produced whenever the known relationship between the input current and output current deviates from the known relationship by more than a selected factor.

The novel features of the invention are set forth with particularity in the appended claims. The invention will best be understood from the following description when read in conjunction with the accompanying drawings.

DETAILED DESCRIPTION OF THE PREFERRED EMBODIMENTS

The present invention may best be described in connection with a specific inverter, although from the following description it will become apparent that the invention is not limited thereto. For explanatory purposes, the invention will be described in connection with an inverter that has the following properties:

1. It is a DC to AC inverter with a transformer turns ratio, $K = T_p/T_s = 3/5$, where $T_p$ and $T_s$ represent the number of turns of the primary and secondary windings of the transformer in the inverter.

2. Under normal load conditions from no load to full load, the DC input voltage defined as $V_i$, is regulated and is essentially constant at 30v. The output voltage, defined as $V_o$, is equal to 50v at no load and equals about 47.5 volts at full load. Thus, at no load, $V_o = V_i/K$, and at full load, it is nearly equal to that value.

3. The input current $I_i$ is substantially related to the output current $I_o$ by the linear relationship $I_i = I_o/K$. Under normal conditions, $I_i$ varies from substantially 0 amperes (A) at no load to 10A at full load, and the output current $I_o$ varies from 0A at no load to 6A at full load. In practice, under no load, when $I_o = 0A$, $I_i$ is very small rather than zero. However, for explanatory purposes, it can be thought of as equal to 0A.

4. Under overload conditions, the input and output voltages vary linearly from 30v to 4v and from approximately 47.5v to 0v, respectively.

Figure 1:
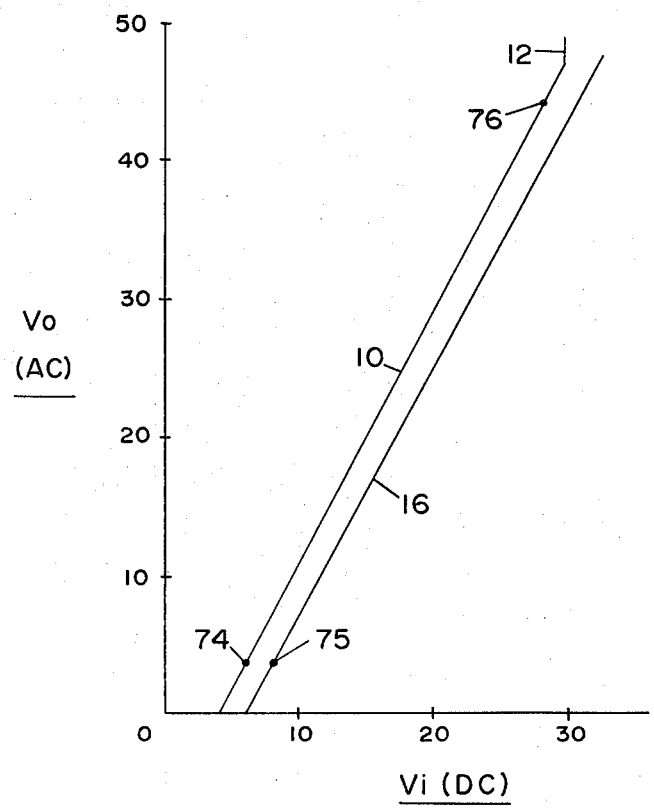
FIG. 1 is a diagram of input voltage vs. output voltage of a particular inverter.
Figure 2:
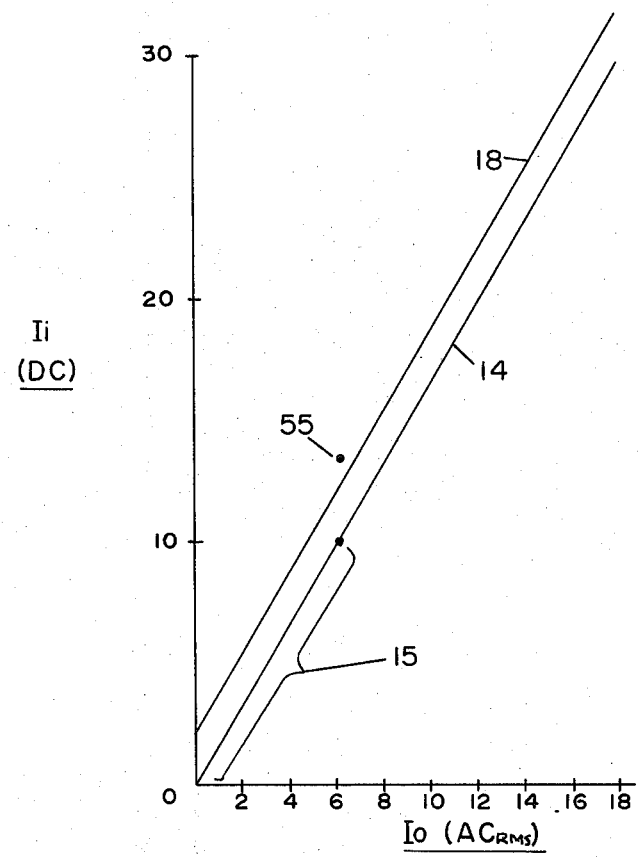
FIG. 2 is a diagram of input current vs. output current of the particular inverter.

These operating characteristics may be represented by the diagrams shown in FIGS. 1 and 2. In FIG. 1, lines 10 and 12 represent the $V_i$ vs. $V_o$ relationship. Line 12 indicates the voltage relationship under normal conditions from no load to full load, while the line 10 indicates the voltages' relationship due to overloading which results in excessive input and output currents thereby pulling down the input and output voltages. In the particular inverter with a shorted load, i.e., $V_o = 0$, the input voltage $V_i = 4v$. In FIG. 2, line 14 represents the currents' relationship $I_i/I_o = 1/K = 5/3$, while section 15 of line 14 indicates the normal load region, namely from no load when both $I_i = 0$ and $I_o = 0$, to full load when $I_i = 10A$ and $I_o = 6A$. The rest of line 14 indicates the overload condition.

It thus becomes apparent that the failure of such an inverter cannot be determined by using directly fixed limits such as low output voltage or excessive input current. This is the case since the inverter's output voltage may be low or the input current excessively high due to excessive loading rather than to inverter failure. In accordance with the present invention, the detection of the inverter failure is based on an approach which is independent of inverter loading. Since in the inverter, both the input and output voltages and the input and output currents are related by linear relationships, represented by the straight lines 10 and 14 and the line segment 12. These relationships are used as the basis of the failure detection criteria. In accordance with the present invention failure is defined as $$V_o < [V_i - C_1]/K \quad (1)$$

and/or $$I_i > I_o/K + C_2 \quad (2)$$

where $C_1$ and $C_2$ are arbitrary constants to account for selected offsets and accuracies in hardware implementation.

Equation (1) represents the desired relationship of the output voltage to the input and bias voltages to effect a failure indication, i.e., when the output voltage $V_o$ is lower than $V_i/K - C_1$ a failure will be indicated. It is easier to understand how the circuitry solves equation (1) if the equation is re-arranged in the following form:

$$V_i > V_o K + C_1 \quad (3)$$

Equation (3) will therefore be used as the voltage failure indication criterion in subsequently explaining the circuit functioning.

In accordance with the present invention, dedicated circuitry is used to compare the input and output voltages. Whenever the input voltage $V_i$ exceeds the output voltage $V_o$ times K plus a bias voltage, which is represented by $C_1$, a failure-signal is produced to indicate inverter failure. Similarly, dedicated circuitry is used to convert $I_i$ and $I_o/K$ into related voltages so that whenever the input current $I_i$ is greater than the sum of the output current $I_o$ divided by K plus a bias voltage, which is represented by $C_2$, an inverter failure signal is produced.

The effect of $C_1$ is represented in FIG. 1 by line 16. As long as for any output voltage $V_o$ the input voltage $V_i$ is to the left of line 16, no failure signal is produced. However, if due to inverter failure for any output voltage $V_o$, the input voltage value is to the right of line 16, a failure signal is produced. Similarly, the effect of $C_2$ is represented in FIG. 2 by line 18. A failure signal is produced only when for any output current $I_o$, the input current $I_i$ is represented by a point to the left of line 18.

Figure 3:
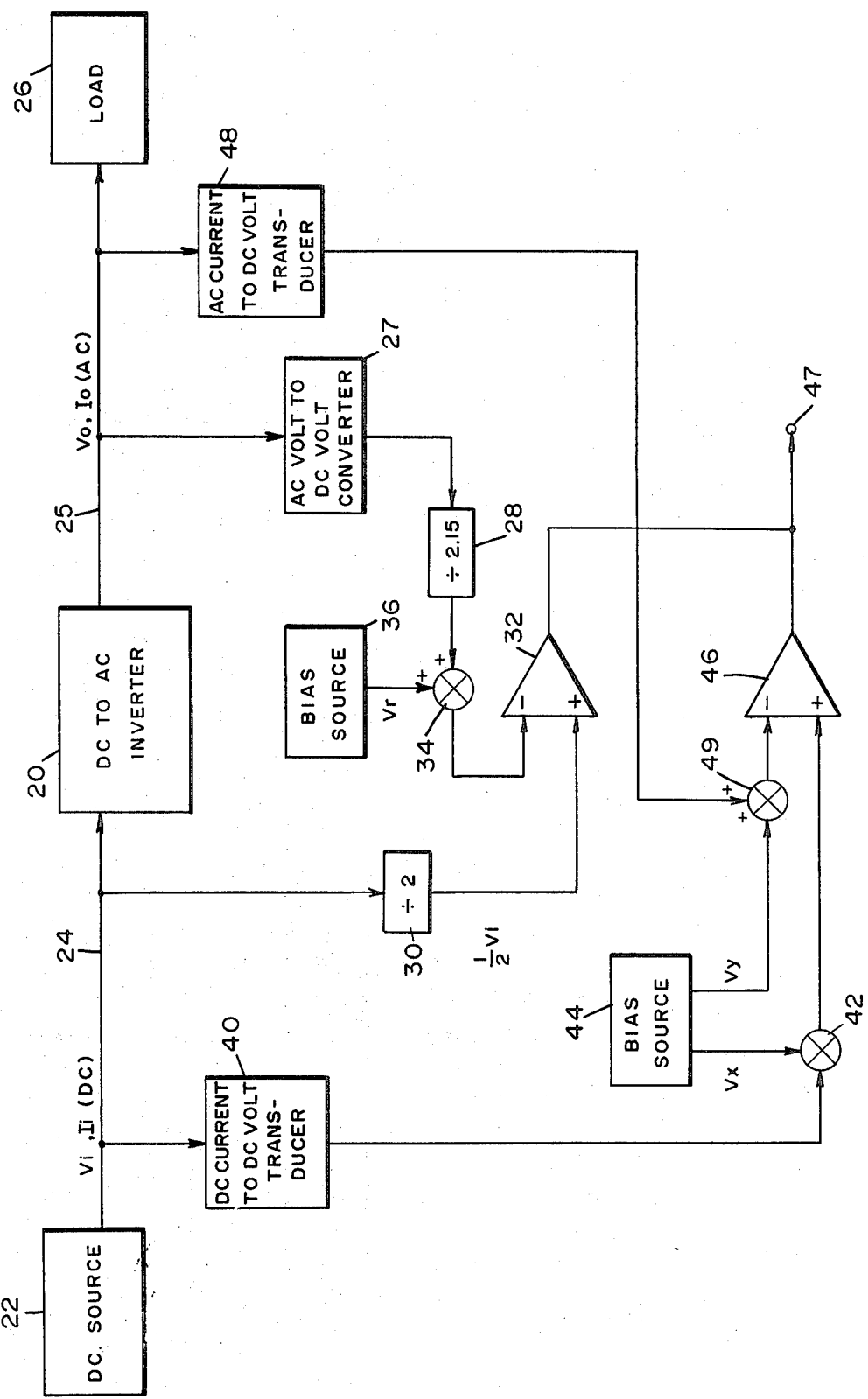
FIG. 3 is a block diagram of a failure detector of the present invention.

Attention is now directed to FIG. 3, which is a block diagram of the inverter failure detector in accordance with the present invention. In FIG. 3, numeral 20 designates the DC to AC inverter, the failure of which is to be detected. The inverter is shown connected to a DC source 22 via input line 24 while an output line 25 is shown connecting the inverter 20 to a load 26.

An AC voltage to DC voltage converter 27 is connected to output line 25 to convert the AC output voltage $V_o$ into a related DC voltage which equals $KV_o$. This voltage is divided by a divider 28. In one embodiment, actually reduced to practice, the divider output is 0.465 $KV_o$ = 0.279 $V_o$. The input voltage $V_i$ is divided by a voltage divider 30 by a factor of two. The output of divider 30, which is ½ $V_i$, is applied directly to the positive or plus input terminal of an operational amplifier 32, while the output of divider 28 is applied to a summer 34. The latter is also connected to a source 36 of a constant bias voltage, designated $V_r$, which can be thought of as corresponding to $C_1/2$. The output of summer 34 is applied to the negative or minus input terminal of amplifier 32. Thus, the two voltages which are applied to amplifier 32 are $V_i/2$ and 0.279 $V_o + V_r$. As long as the voltage at the negative input terminal is higher or more positive than the voltage at the positive input terminal, the output of the amplifier is low. However, once the voltage at the positive terminal is greater than the voltage at the negative terminal, i.e., $$V_i/2 > 0.279 V_o + V_r$$

the output of the amplifier 32 is high. Such an output indicates inverter failure. Hereafter, a high output of amplifier 32 will be referred to as a failure-indicating signal, or simply a failure signal.

The operation of the circuitry described thus far, may best be explained in connection with specific examples. $V_r$ is assumed to be equal to 3.0v. As previously pointed out, under normal no load conditions $V_i = 30v$ and $V_o = 50v$. Thus, the positive terminal of amplifier 32 is at 30/2 = 15v and the negative terminal is at 0.279 $V_o + V_r$ = 0.279 (50) + 3 ≅ 14 + 3 = 17v. Thus, under these conditions, the negative terminal is 2v more positive than the positive terminal and therefore a failure signal is not produced. If, however, due to inverter failure, under no load conditions, the output voltage is less than the expected output voltage of 50v for the monitored input voltage of 30v, so that ½ $V_i$ = 15v is greater than 0.279 ($V_o$) + $V_r$, a failure signal is produced. In the particular example, when the output voltage is 40v, 0.279 (40) + 3 = 11.2 + 3 = 14.2v so that ½ $V_i$ = 15v is greater than 14.2 and a failure signal is produced.

At full load, $V_i \cong 30v$ and $V_o \cong 47.5v$. Thus, at full load in the absence of inverter failure, the voltages at the positive and negative terminals of amplifier 32 are respectively 15v and 0.279 (47.5) + 3 ≅ 16.3v. Consequently, no failure signal is produced. If, however, due to inverter failure the output voltage is less than the expected output voltage of 47.5 for the monitored input voltage of 30v, e.g., if $V_o$ = 40v then (0.279) (40) + 3 = 14.2v so that ½ $V_i$ = 15v > 0.279 $V_o + V_r$ and therefore, a failure signal is produced.

It should be pointed out that in the absence of inverter failure, a failure signal is not produced even when the input and output voltages drop significantly from their levels under normal load conditions due to excessive loading unless the positive terminal of amplifier 32 is at a voltage higher than the negative terminal. For example, as shown in FIG. 1, the output voltage $V_o$ may drop to zero due to a shorted load, at which time the input voltage is 4v. Under these conditions, the output of divider 30 is 4/2 = 2v, while the output of converter 26 is 0v since $V_o = 0$. Therefore, the voltage at the negative terminal of amplifier 32 is only the bias voltage $V_r$ = 3v. However, since the positive terminal is at 2v, a failure signal is not produced. Such a signal would be produced if due to inverter failure when the load is nearly shorted out, the inverter output voltage drops to zero volts with the input voltage above 6v. In such a case, the positive terminal of amplifier 32 is above 3v and therefore is more positive then the 3v at the negative terminal, resulting in a high output of amplifier 32, which represents inverter failure, since the inverter puts out less than the expected output for greater than 6v input.

From the foregoing, it is thus seen that in the present invention, the input and output voltages of the inverter are continuously monitored. Even though these voltages which are linearly related as represented by lines 10 and 12 of FIG. 1 are subject to changes over a large range, a failure signal is not produced unless the output voltage is less than the expected output voltage for the monitored input voltage by a selected factor.

Attention is again directed to FIG. 3. As shown therein, the input current $I_i$ is converted into a related voltage by a DC current to DC voltage transducer 40. This voltage is applied to a summer 42, which sums it with a bias voltage $V_x$ from a bias source 44. The output of summer 42 is connected to the positive input terminal of an operational amplifier 46. Similarly, the AC output current $I_o$ is converted by a transducer 48 into a related DC voltage which is applied to a summer 49 to which a bias voltage $V_y$ from bias source 44 is also supplied. The output of summer 49 is applied to the negative input terminal of amplifier 46. The latter provides a high output, indicating inverter failure only when the voltage at the negative terminal is lower than the voltage at the positive terminal. The outputs of the two amplifiers are connected together at an output terminal 47. Thus, inverter failure is indicated when the output of either or both amplifiers 32 and 46 is high, and therefore output terminal 47 is high.

The operation of this circuitry may best be described in connection with specific examples. Therein it is assumed that the transducer 40 provides an output of 0.5v per ampere of input current ($I_o$) and that transducer 48 provides an output of 5/6v per ampere of output current ($I_o$). Also, $V_x$ is assumed to be equal to 5.2v and $V_y = 6.2v$. The currents' relationship is as represented by line 14 in FIG. 2. That is, in the absence of inverter failure $$I_i = I_o/K = 5/3\ I_o$$

Under no load conditions in the absence of inverter failure, $I_i = 0$ and $I_o = 0$. Thus, the voltages at the positive and negative terminals of amplifier 46 are $V_x = 5.2v$ and $V_y = 6.2v$, respectively. Since the negative terminal is at a higher voltage than the positive terminal, no failure signal is produced. If, however, due to inverter failure $I_i$ is greater than 2 amps, while $I_o$ remains equal to 0, the output of transducer 40 is greater than 1v and therefore the voltage at the positive terminal is greater than $5.2 + [>1] > 6.2v$. Consequently, the positive terminal is at a voltage which is greater than the 6.2v at the negative terminal and therefore the output of the amplifier 46 is high thereby representing a failure signal.

As seen from FIG. 3, the two inputs to the amplifier 46 are biased by $V_x$ and $V_y$. This is necessary to insure that the amplifier 46 is biased to operate in its common mode operating region when the input and output currents are very low. For example, when $I_i = 0$ and $I_o = 0$, unless biased, the input terminals of the amplifier 46 would be at 0v each, which is outside the common mode operating region of the amplifier in the operating embodiment because no negative power source was employed. However, by biasing both input terminals to 5.2v and 6.2v, even when the currents are zero, the terminals are at sufficiently high voltages. With this arrangement, the differential bias applied to the amplifier is $6.2v - 5.2v = 1.0v$, equivalent to 2 amperes offset as shown by line 18, FIG. 2.

Under full load, $I_i = 10A$ and $I_o = 6A$. Thus, the output of each of transducers 40 and 48 is 5v. Consequently, the summed voltage at the negative terminal is $5v + 6.2v = 11.2v$, and the summed voltage at the positive terminal is $5v + 5.2v = 10.2v$. Since the negative terminal is more positive than the positive terminal, no failure signal is produced. Similarly, even under overload conditions, as long as the voltage at the negative terminal of amplifier 46 is positive with respect to the voltage at the positive terminal, no failure signal is produced. For example, assuming the input and output currents to be 30A and 18A respectively, the output voltage of each of transducers 40 and 48 is equal to 15v. Thus, the voltages at the negative and positive terminals of amplifier 46 are $15 + 6.2 = 21.2v$, and $15 + 5.2 = 20.2v$, respectively. Thus, no failure signal is produced.

However, whenever due to inverter failure, the input current is excessive with respect to the output current so that the output voltage of transducer 40, when added to the bias voltage $V_x = 5.2v$, is greater than the sum of the output voltage of transducer 48 and the bias voltage $V_y = 6.2v$, a failure signal is produced. For example, assuming that at full load when the output current $I_o = 6A$, the input current $I_i$, instead of being equal to 10A is equal to 13A, as represented by point 55 in FIG. 2, the outputs of transducers 40 and 48 are 6.5v and 5v, respectively. Thus, the voltage at the positive terminal of amplifier 46 is $6.5v + 5.2v = 11.7v$ and the voltage at the negative terminal is $5v + 6.2v = 11.2v$. Consequently, since the negative terminal is at a voltage below the positive terminal, a failure signal is produced. In the particular example, since the bias at the negative terminal is 1v above the bias at the positive terminal and since transducer 40 produces an output of 0.5v per ampere of input current, a failure signal is produced by amplifier 46 whenever the input current is greater by 2A than the expected input current for the monitored output current which is sensed by transducer 48. Alternately stated, a failure signal is produced whenever $I_i > I_o/K + 2$.

From the foregoing, it is thus seen that in the failure detector of the present invention, the input and output voltages of an inverter are compared. These voltages, which are subject to change over a wide range due to other than inverter failure are related by a known relationship, such as that represented by line 10. In the failure detector, a failure signal is produced, indicating inverter failure, only when the output voltage, which is compared with the input voltage is less than the expected output voltage for the monitored input voltage, based on their known linear relationship by a known substantially constant factor. Similarly, the inverter's input and output currents which are related by a known linear relationship, as represented in FIG. 2, by line 14, are compared. A failure signal is produced, indicating inverter failure, only when the input current with which the output current is compared, exceeds by a known substantially constant factor the expected input current for the particular monitored output current, based on their known linear relationship.

Figure 4:
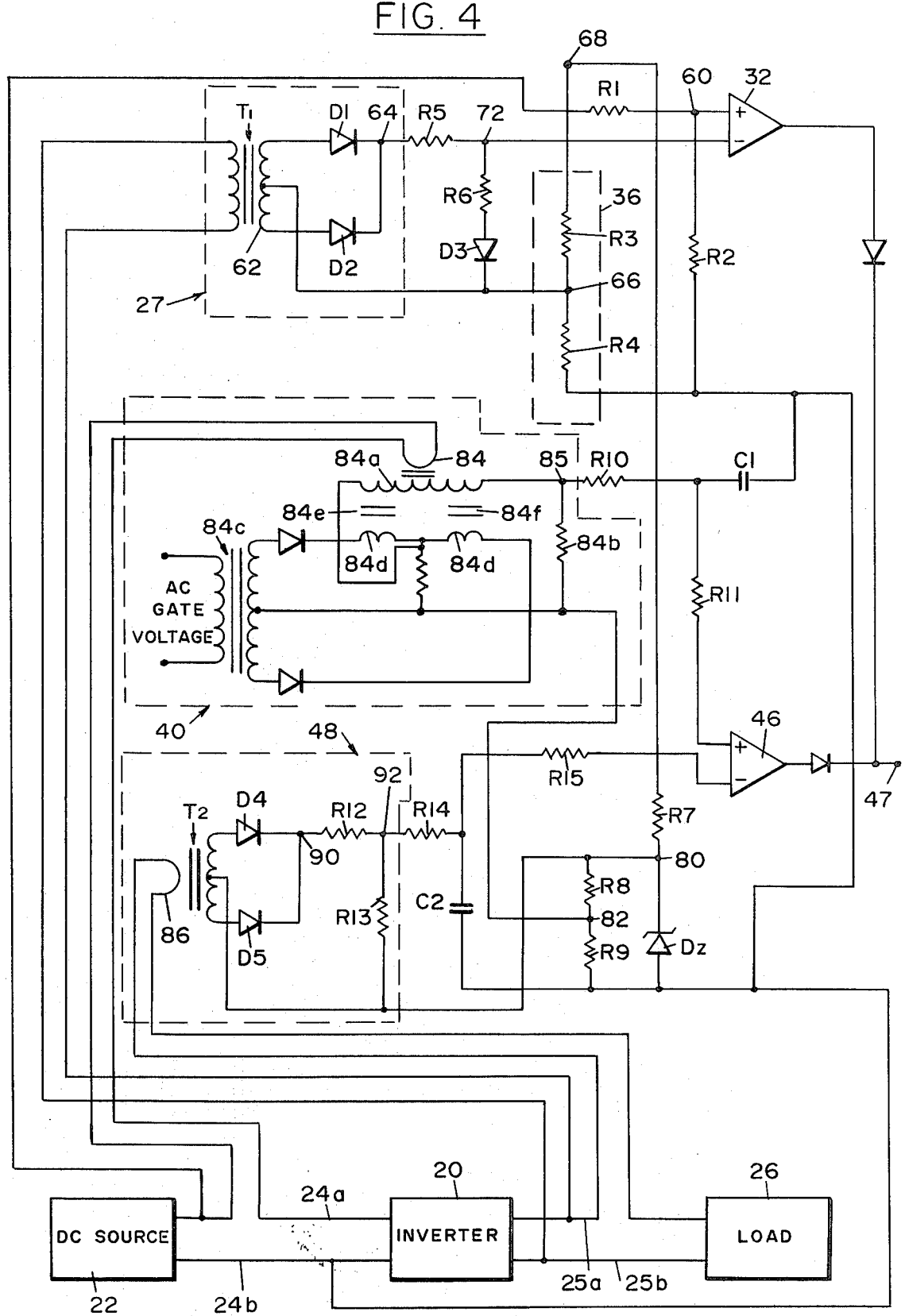
FIG. 4 is a schematic diagram of the failure detector shown in FIG. 3.

Attention is now directed to FIG. 4, which is a schematic diagram of one embodiment of the failure detector of the present invention which was actually reduced to practice. Therein, the inverter 20 is shown connected to the DC power source 22 by input lines 24a and 24b. Line 24b is the DC voltage return line. The output lines 25a and 25b of the inverter connect the inverter to the AC load 26. The DC input voltage is applied to the divider 30 (of FIG. 3) which consists of a pair of equal resistors R1 and R2 connected in series across lines 24a and 24b. The junction point 60 is always at a voltage which is half the DC input voltage, $V_i$.

Point 66 is the junction point of serially connected resistors R3 and R4 which are connected between a terminal 68 at which +30v DC is applied and DC line 24b. R3 and R4 are chosen so that the voltage at point 66 is fixed at approximately 3v DC. R3 and R4 represent the bias source 36 (see FIG. 3) and the 3v DC represents the bias voltage $V_r$.

The AC voltage to DC voltage converter 27 consists of a full wave rectifier which includes a transformer T1 and a pair of diodes D1 and D2. The primary winding 61 of T1 is connected across output lines 25a and 25b, while the secondary winding 62 is connected to diodes D1 and D2 whose cathodes are connected together at a junction point 64. The windings' turns ratio is chosen so that the DC voltage at point 64 with respect to point 66 is equal to the AC output voltage times K which is 3/5. Thus, when $V_o = 50v$, the DC voltage at point 64 with respect to point 66 is $50 \times 3/5 = 30v$.

Junction point 64 is also connected to point 66 through resistors R5 and R6 and a diode D3. The latter is chosen to compensate for the voltage drops in diodes D1 and D2 and for temperature compensation. R5 and R6 are chosen so that the voltage at their junction point 72 is a selected portion of the rectified voltage at point 64 with respect to point 66. With R5 and R6 equal to 365K ohms and 316K ohms, respectively, the voltage at point 72 with respect to point 66 is about 0.465 of the voltage at point 64 which equals $3/5 V_o$. Thus, the voltage at point 72 which is applied to the negative terminal of amplifier 32 is approximately $0.279 V_o$, plus the voltage at point 66. Due to the bias voltage $V_r = 3v$ which is present at point 66, the voltage at the negative terminal is $0.279 V_o + 3v$. Relating the circuitry shown in FIG. 4 to that shown in FIG. 3, R5 and R6 represent the divider 28 while point 72 is the output of summer 34 since the voltage thereat is equal to the bias voltage $V_r = 3v$, plus $0.279 V_o$ from divider 28.

Directing attention to FIG. 1, while keeping in mind the circuitry just described, it is seen that under inverter failureless conditions when the inverter's input voltage $V_i$ is 6 volts DC, the output voltage $V_o = 4v$. This is represented by point 74 on line 10. Thus, the voltage at the positive terminal of amplifier 32 is $6/2 = 3v$, while the voltage at the negative terminal is $4 \times 0.279 + 3 = 1.12 + 3 = 4.12$. Thus, the negative terminal is biased more positively than the positive terminal by $4.12 - 3 = 1.12v$ and therefore a failure signal is not produced. If, however, due to inverter failure $V_i$ is 8.25v, while $V_o$ remains at 4 volts, as represented by point 75 on line 16 of FIG. 1, while the voltage at the negative terminal remains at 4.12 volts, the voltage at point 60 is $8.25/2 = 4.125$. Thus, the negative terminal is at a potential below the potential at the positive terminal and therefore a failure-indicating signal is produced.

Similar performance takes place near the other end of the voltage range. At $V_i = 29v$, $V_o \cong 45.5v$, as represented by point 76. Thus, the voltage at point 60 is $29/2 = 14.5v$, while at point 72 it is $45.5 \times 0.279 + 3 = 15.69v$. Thus, point 72 is positively biased with respect to point 60 by $15.69 - 14.5 = 1.19v$, which is nearly equal to the positive bias of 1.12v near the other end of the voltage range when $V_o = 4$ and $V_i = 6$. It is thus seen that line 16 is effectively parallel to line 10 and the offset is essentially constant. The offset or the area between lines 10 and 16 represents the value by which the output voltage may be less than the expected output voltage for each input voltage, before a failure signal is produced. In the present example, it is about 2.3 volts.

Attention is again directed to FIG. 4 in which a specific embodiment of the current comparing circuitry is shown. As seen from FIG. 4, a Zener diode $D_z$ is connected in series with a resistor R7 across the +30v DC. The Zener diode is assumed to be a 6.2v diode. Thus, the voltage at point 80 is constant at 6.2v DC. Resistors R8 and R9 are connected across Zener diode $D_2$. These resistors are selected so that their junction point 82 is at 5.2v. Thus, resistors R7, R8, and R9 together with diode $D_z$ serve as the bias source 44 (see FIG. 3) which provides two bias voltages, $V_x = 5.2v$ at point 82, and $V_y = 6.2v$ at point 80.

As seen from FIG. 4, points 82 and 80 are connected to transducer 40 and 48, respectively. Transducer 40 operates as a magnetic amplifier used as a DC transformer. The DC input current is sensed by a single turn control winding 84 in the input line 24a. The current which is induced in a load winding 84a depends on the input current and the turns ratio of windings 84 and 84a. Assuming that the latter is 1:2000, the current induced in load winding 84a is 500 $\mu$a per ampere of input current. This current is fed to a 1000 ohm resistor 84b. Thus, the voltage across the resistor which is present at a terminal 85 with respect to point 82 is 500 $\mu$a $\times$ 1000 ohm = 0.5 volt per ampere of input current. The rest of the circuitry of transducer 40 consists of a transformer 84c and full wave rectifier to alternately apply each half cycle a rectified voltage to gate windings 84d which in turn reset cores 84e and 84f each half cycle. Thus, at all times at least one core is in the unsaturated state to insure transformer action between the control winding 84 and the load winding 84a. Such arrangements are well known in the art.

In the absence of the 5.2v bias at point 82 which is connected to one end of resistor 84b, the voltage at terminal 85 is 0.5 volt per ampere of input current. However, due to the 5.2v bias, the potential at point 85 is 5.2v plus 0.5v per ampere of input current. Thus, at full load in which it is assumed that $I_i = 10A$, the potential at point 85 is $5.2v + 0.5 \times 10 = 5.2v + 5v = 10.2v$. This voltage is applied through resistors R10 and R11 to the positive terminal of amplifier 46.

The AC output current $I_o$ sensed by transducer 48 by means of a single turn winding 86 in output line 25a. Winding 86 is the primary winding of a transformer T2 whose secondary winding 88 has 1000 turns to each end from the center tap. The ends of winding 88 are connected to diodes D4 and D5 which are connected together at point 90. Point 90 is connected through resistors R12 and R13 to the center tap and to point 80, which is at 6.2v. Resistors R12 and R13 are selected so that at their junction point 92, in the absence of the 6.2v bias, the potential is equal to 5/6v per ampere of output current. Thus, at full load, as hereberfore assumed, $I_o = 6A$ and therefore, the potential at point 92 is 5 volts. However, due to the 6.2v bias, point 92 is at 6.2v plus 5/6 volt per ampere of output current. Point 92 is connected to the negative terminal of amplifier 46 through resistors R14 and R15, which are equal to resistors R10 and R11, respectively. For filtering purposes, the junction points of resistors R10 and R11, and R14 and R15 are connected to input line 24b through capacitors C1 and C2, respectively.

From the foregoing, it should be appreciated that as long as the ratio of the output current $I_o$ to input current $I_i$ remains equal to $K = 3/5$, as represented by line 14 in FIG. 2, the voltage difference between the negative and positive terminals of amplifier 46 is 1 volt. For example, when $I_i = 0$ and $I_o = 0$, the voltages at the negative and positive terminals are 6.2v and 5.2v, respectively, for a voltage difference of $6.2 - 5.2 = 1v$. Similarly, at $I_i = 20A$ and $I_o = 12A$, representing 100 percent overload of full load, the voltage at the negative terminal is $12 \times 5/6 + 6.2 = 10 + 6.2 = 16.2v$, and the voltage at the positive terminal is $20 \times 0.5 + 5.2 = 10 + 5.2 = 15.2v$. Thus, the voltage difference is 1v. Consequently, no failure-indicating signal is produced.

However, when due to failure of the inverter, the input current exceeds the normal input current for the particular output current by a chosen number of amperes, which in the present example is 2A, a failure signal is produced. For example, at full load, the normal input current is 10A and the output current is 6A. Therefore, the voltages at the negative and positive terminals should be $6 \times 5/6 + 6.2 = 5 + 6.2 = 11.2v$ and $10 \times 0.5 + 5.2 = 5 + 5.2 = 10.2$, respectively. Thus, under normal conditions, no failure indicating signal is produced. If, however, when the output current is 6A, the input current instead of 10A is more than 12A, e.g., 13A as represented by point 55 in FIG. 2, the voltage at the negative terminal remains $6 \times 5/6 + 6.2 = 5 + 6.2 = 11.2v$. However, the voltage at the positive terminal instead of 10.2v is actually $13 \times 0.5 + 5.2 = 6.5 + 5.2 = 11.7v$. Thus, the negative terminal is at a lower voltage than the positive terminal and therefore a failure-indicating signal is produced.

In the present example, since the negative terminal is biased by 1v above the positive terminal and since transducer 40 provides an output of 0.5v per ampere of input current, a failure-indicating signal is produced, whenever due to inverter failure the input current exceeds the normal input current for the particular output current by more than 2A. The 2A range is represented in FIG. 2 by the offset between lines 14 and 18.

Although hereberfore the invention has been described in connection with an inverter having specific input and output voltages' and currents' relationships, it should be appreciated that the invention is not limited thereto. The failure detector can be employed to indicate failure of any circuit whose input and output voltage and/or input and output currents, though subject to variations over large ranges are substantially linearly related. Alternately stated, the detector can be used to indicate failure of a circuit whose input and output voltages are linearly related so that their relationship can be represented by a straight or nearly straight line, such as line 10 in FIG. 1. Also, if the plot of the input current of the circuit vs. the output current can be represented by a straight or nearly straight line, such as line 14 in FIG. 2, the detector of the present invention can be used to indicate circuit failure whenever this relationship is exceeded by a chosen factor. Furthermore, both the voltages' and currents' relationships may be monitored to indicate circuit failure whenever either the input voltage or the input current exceeds the expected value based on the known relationships and the monitored output voltage or current.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In combination with an inverter of the type including a pair of input terminals across which an input voltage, definable as $V_i$, is appliable with an input current, definable as $I_i$, passing through said input terminals to said inverter, said inverter including a pair of output terminals connectable to a load for supplying an output current, definable as $I_o$, to said load at an output voltage between said output terminals, definable as $V_o$, wherein $V_i$ is related to $V_o$ by a first known substantially linear relationship, and wherein $I_i$ is related to $I_o$ by a second known substantially linear relationship, an arrangement comprising:

first means coupled to said input and output terminals for comparing said input and output voltages and for providing a failure signal, indicating inverter failure, only when the output voltage is less by a first preselected value than the expected output voltage for the input voltage with which said output voltage is compared, based on the first known linear relationship between said input and output voltages; and second means coupled to said input and output terminals for comparing the input and output currents and for providing a failure signal, indicating inverter failure, only when the input current exceeds by a second preselected value the expected input current for the output current with which the input current is compared, based on the second known linear relationship.

2. The combination as recited in claim 1 wherein said first means include means responsive to said input voltage for providing a first signal related thereto, means responsive to said output voltage for providing a second signal related thereto, first bias means for providing a first fixed bias signal, means for combining said second signal with said first bias signal to provide a first summed signal, and first comparing means for providing said failure signal only when said first summed signal is less than said first signal.

3. The combination as recited in claim 2 wherein said input and output voltages are DC and AC voltages, respectively, and wherein based on said first known substantially linear relationship the value of said input voltage is linearly variable from a first input voltage value to a second input voltage value, and the value of said output voltage is linearly variable from a first output voltage value when said input voltage value is equal to said first input voltage value to zero when said input voltage value is equal to said second input voltage value.

4. The combination as recited in claim 1 wherein said second means include means responsive to said input current for providing a first signal related to said input current, means responsive to said output current for providing a second signal related to said output current, bias means for providing a first fixed bias signal and a second fixed bias signal greater than said first fixed bias signal, means for combining said first signal with said first fixed bias signal to provide a first summed signal, means for combining said second signal with said second fixed bias signal to provide a second summed signal, and comparing means responsive to said first and second summed signals for providing said failure signal only when said first summed signal is greater than said second summed signal.

5. The combination as recited in claim 4 wherein said input and output currents are DC and AC currents, respectively, and wherein the input current amplitude in the absence of inverter failure is equal to the output current amplitude divided by a fixed constant, with both said input and output current amplitudes varying linearly from first and second values substantially to zero and zero, respectively.

6. The combination as recited in claim 5 wherein said first means include means responsive to said input voltage for providing a first signal related thereto, means responsive to said output voltage for providing a second signal related thereto, first bias means for providing a first fixed bias signal, means for combining said second signal with said first bias signal to provide a first summed signal and first comparing means for providing said failure signal only when said first summed signal is less than said first signal.

7. The combination as recited in claim 6 wherein said input and output voltages are DC and AC voltages respectively, and wherein in the absence of inverter failure, the value of said input voltage varies linearly from a first input voltage value to a second input voltage value, and the value at said output voltage varies linearly from a first output voltage value when said input voltage value is equal to said first input voltage value to zero when said input voltage value is equal to said second input voltage value.

8. For use in combination with a circuit to which an input voltage from a source is applied and to which an input current flows from said source, said circuit being connected to a load for supplying said load with an output current, at an output voltage, wherein in the absence of circuit failure the input and output voltages are related by a first substantially linear relationship and the input and output currents are related by a second substantially linear relationship, a failure detector comprising:

first means responsive to the input and output voltages of said circuit for providing a first failure signal, indicating circuit failure, only when the relationship between the input and output voltages to which said first means is responsive differs by a first preselected factor from said first substantially linear relationship; and second means responsive to the input and output currents of said circuit for providing a second failure signal indicating circuit failure only when the relationship between the input and output currents to which said second means is responsive differs by a second preselected factor from said second substantially linear relationship.

9. A failure detector as recited in claim 8 wherein said first means include means for providing first and second signals which are respectively related to said input and output voltages, a first bias signal and means for generating said first failure signal only when the sum of the amplitudes of said second signal and said first bias signal is less than the amplitude of said first signal, and wherein said second means include means for providing third and fourth signals which are respectively related to said input and output currents, a second bias source for providing third and fourth bias signals, said third bias signal being less than said fourth bias signal, and means for providing said second failure signal only when the sum of the amplitudes of said third signal and said fourth bias signal is less than the sum of the amplitudes of said second signal and said third bias signal.

10. A failure detector as recited in claim 9, wherein said means for providing said first failure signal comprises a first operational amplifier having a first input terminal to which said first signal is applied, and a second input terminal to which a signal of an amplitude, which is equal to the sum of the amplitudes of said second signal and said first bias signal, is applied, said first operational amplifier providing an output representing said first failure signal only when the signal amplitude at its second input terminal is less than the amplitude of said first signal applied at its second input terminal.

* * * * *